INVENTOR.
Richard A. Duncan
BY
Lothrop & West
Attorneys

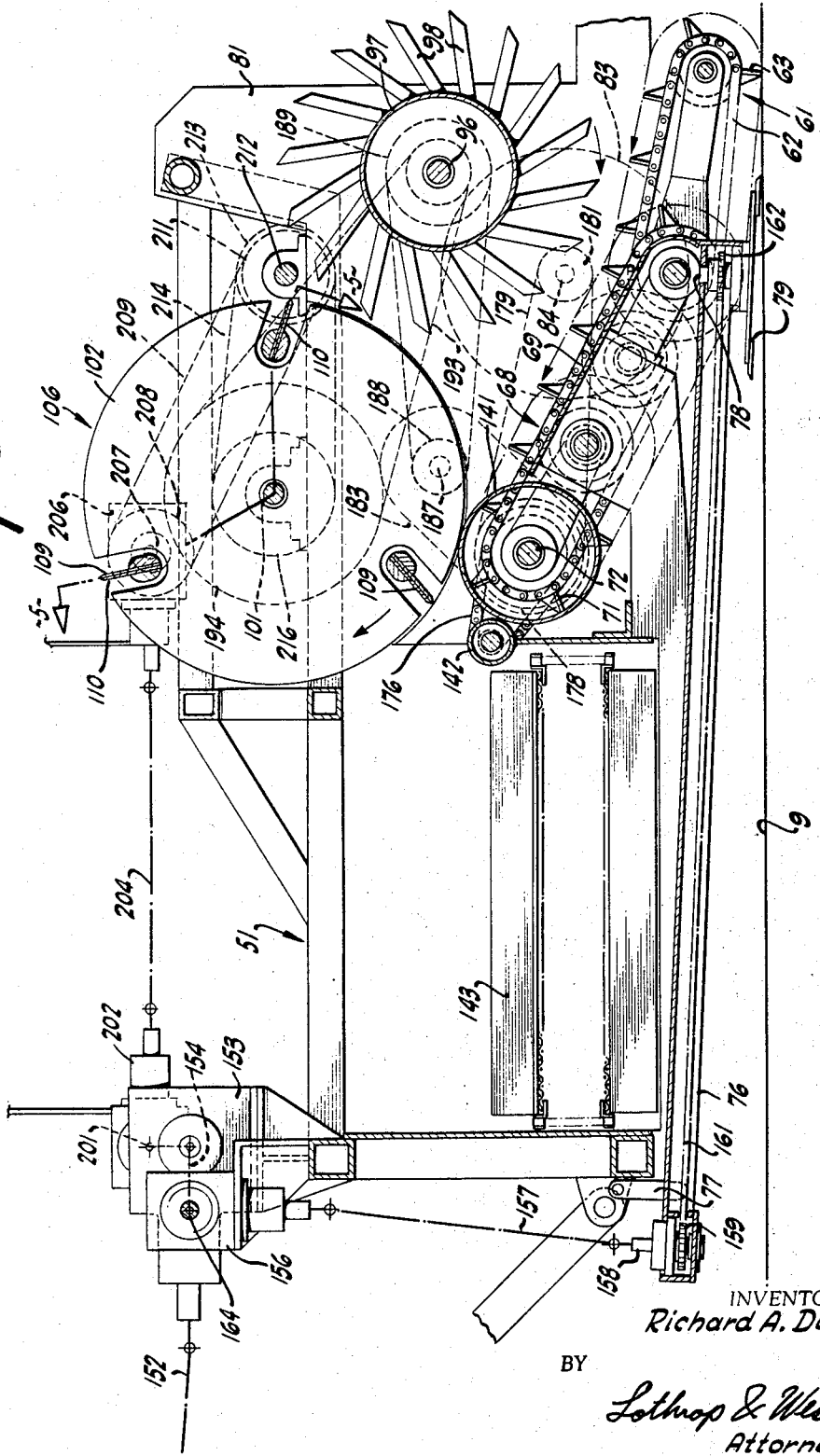

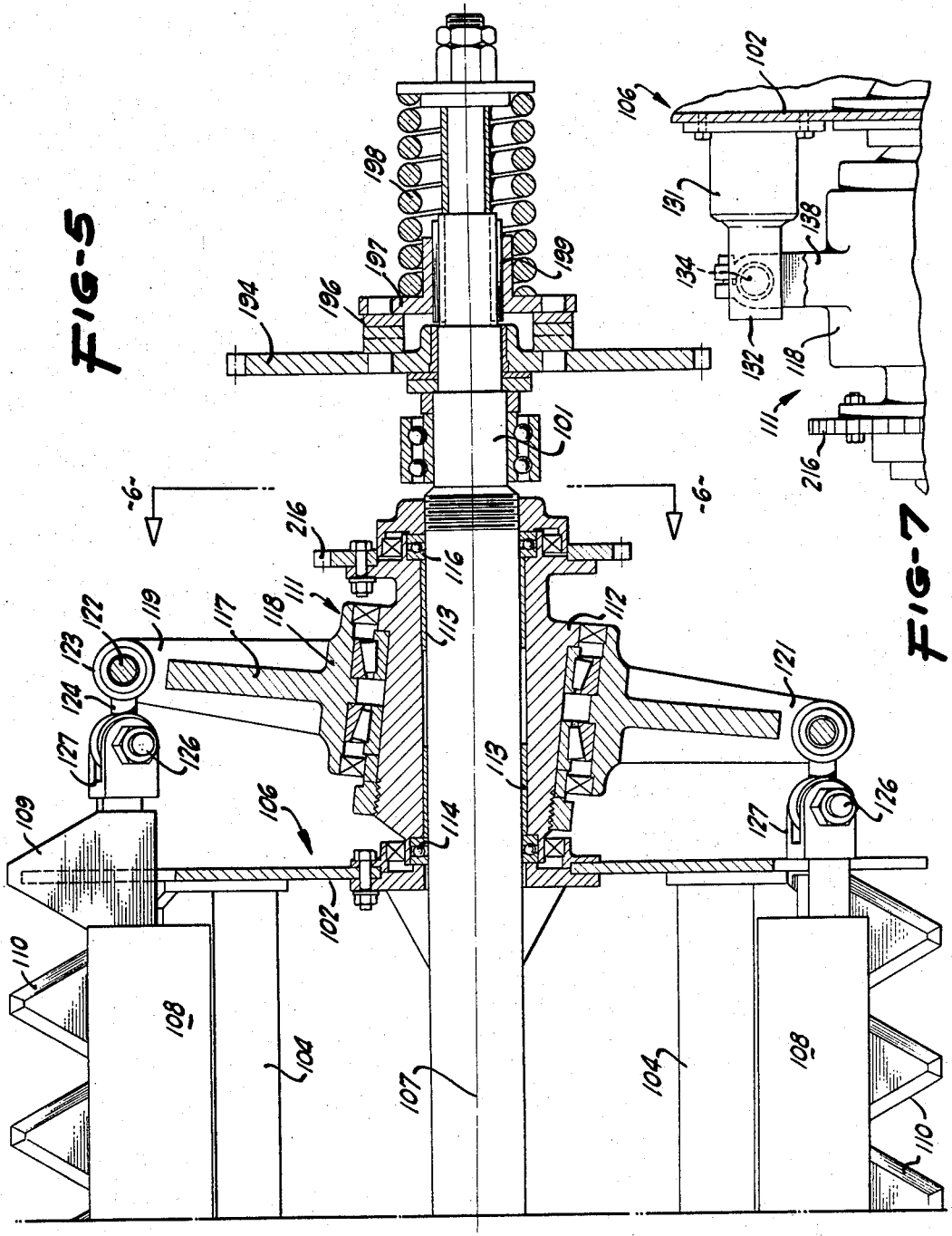

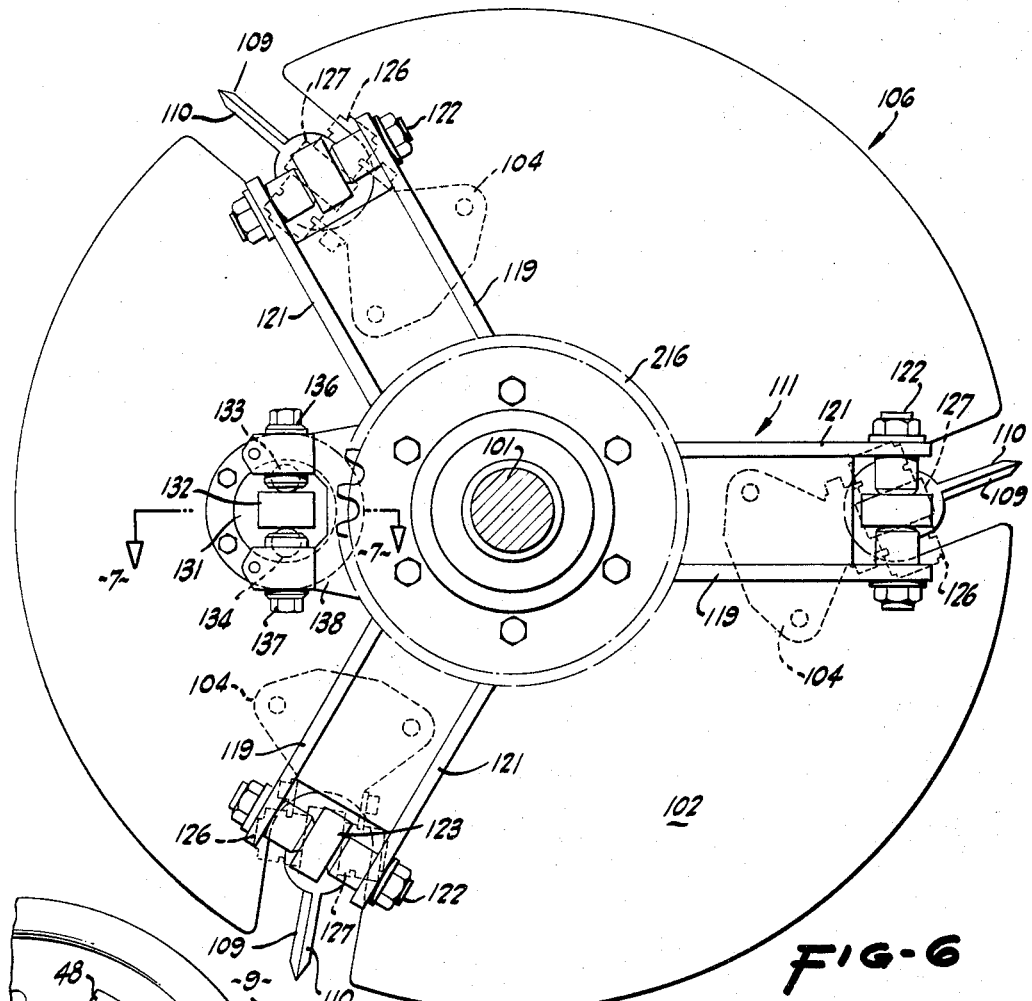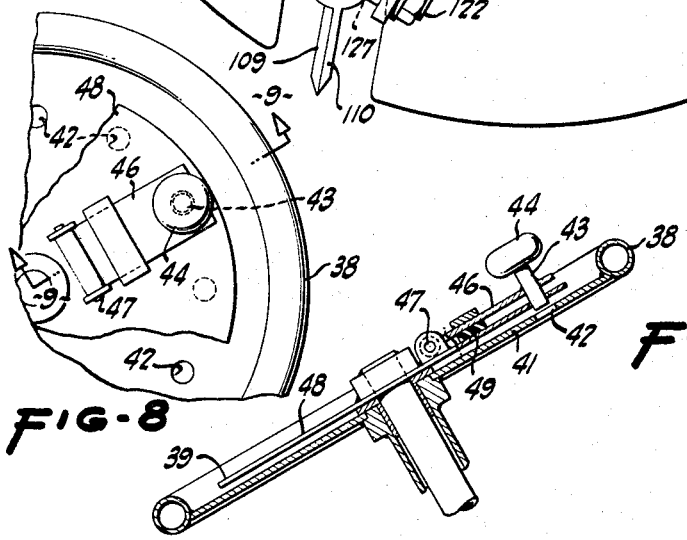

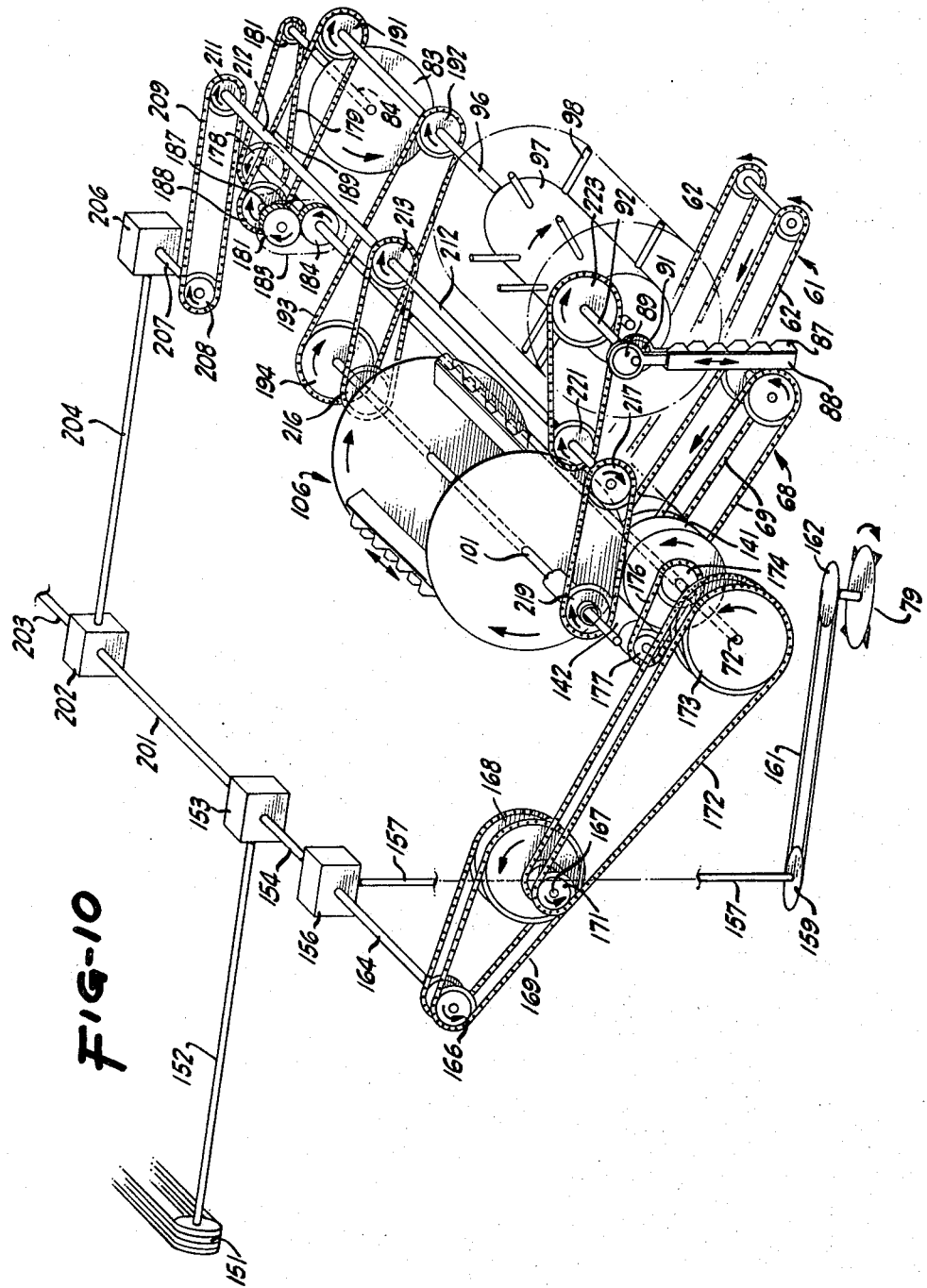

ns in the accompanying description and illustrated in the accompanying drawings, in which:

United States Patent Office 3,419,896
Patented Dec. 31, 1968

3,419,896
SUGAR CANE HARVESTER
Richard A. Duncan, Lafayette, La., assignor, by mesne assignments, to The Thomson Machinery Company, Inc., a corporation
Filed Dec. 30, 1964, Ser. No. 422,116
9 Claims. (Cl. 146—133)

ABSTRACT OF THE DISCLOSURE

The disclosure comprises a self-contained harvester movable through a sugar cane field, and includes machinery effective to sever and gather in the cane, to cut the cane into desired lengths and to discharge the cut lengths from the machine.

My invention relates to devices primarily useful in a field of sugar cane for the purpose of retrieving the cane from the field, processing it in a preliminary way and transferring it from the harvesting machine for further processing.

The invention further relates to a self-contained, mobile harvester effective to retrieve cane from a field whether the cane is in its normal erect growing location or is in a disarrayed or random condition.

While sugar cane harvesters have heretofore been proposed and constructed, they are not always capable of dealing appropriately with sugar cane as actually encountered in a field.

It is therefore an object of my invention to provide a sugar cane harvester which in general is an improvement over sugar cane harvesters heretofore available.

Another object of my invention is to provide a sugar cane harvester in which all of the necessary and desirable functions of detaching the cane from its location in the field, of gathering the cane into the harvester, of preliminarily processing the cane, and of transporting the cane to a station for further handling are effectually accomplished.

Another object of the invention is to provide a sugar cane harvester in which improved means are provided for dividing the harvested cane into sections of substantially predetermined length for further handling.

Another object of the invention is to provide improved means for gathering the sugar cane from the field.

Another object of the invention is to transmit the gathered material through the machine with facility, without jamming or binding and without causing difficulty with the machinery.

Another object of the invention is to provide a sugar cane harvester in which the various harvesting instrumentalities are appropriately driven from a common power source.

A still further object of the invention is to provide a mobile sugar cane harvester that can operate well in the customary sugar cane field cultivated in parallel furrows.

Another object of the invention is to provide a sugar cane harvester of substantial capacity and capability that can operate in a field under the control of a single operator.

Other objects together with the foregoing are attained in the embodiment of the sugar cane harvester described in the accompanying description and illustrated in the accompanying drawings, in which:

FIGURE 4 is a cross section to an enlarged scale, the plane of section being indicated by the line 4—4 of FIGURE 2;

FIGURE 5 is a cross section to an enlarged scale through a portion of the sickle bar drum and attendant mechanism of the machine, the planes of section being indicated by the lines 5—5 of FIGURE 4;

FIGURE 6 is an end elevation, with a portion in section, of the sickle bar drum, the plane of the section being indicated by the line 6—6 of FIGURE 5;

FIGURE 7 is a detail to an enlarged scale showing a portion of the sickle bar drum drive mechanism, the plane of section being indicated by the line 7—7 of FIGURE 6;

FIGURE 8 is a partial plan of the steering control mechanism pursuant to the invention;

FIGURE 9 is a cross section, the plane of which is indicated by the line 9—9 of FIGURE 8; and FIGURE 10 is a diagram in isometric projection showing some of the principal drive connections of the sugar cane harvester.

Figure 2:
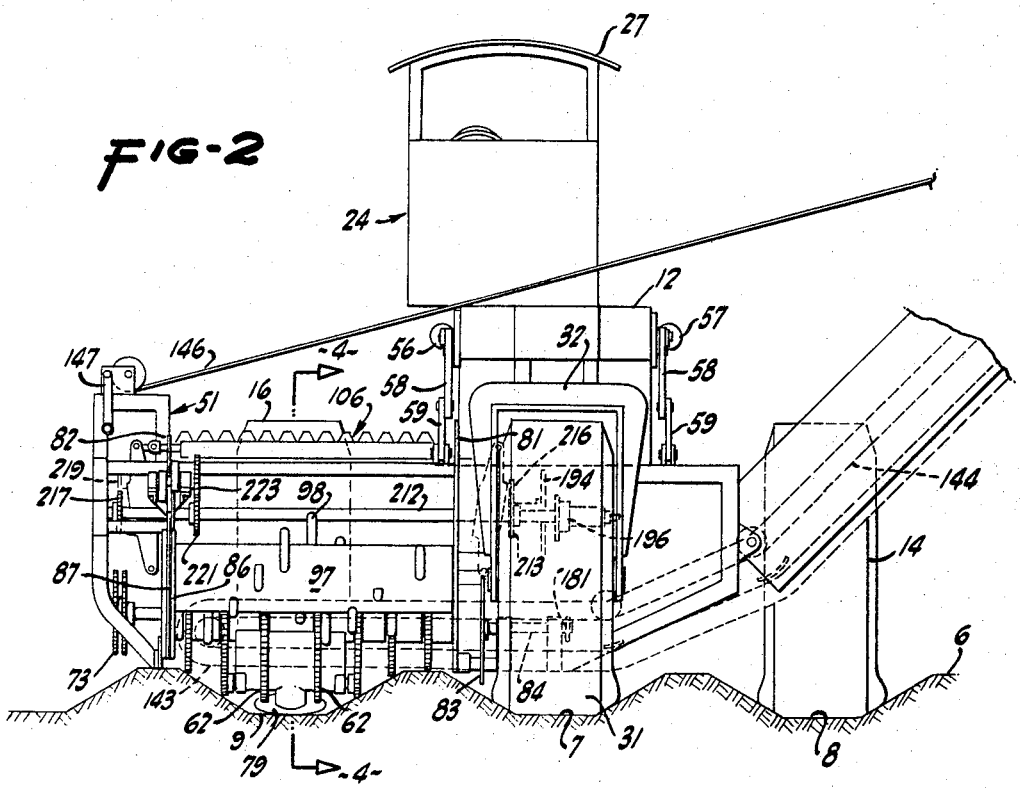
FIGURE 2 is a front elevation of a sugar cane harvester constructed pursuant to the invention, certain portions being removed for clarity of illustration.

While the sugar cane harvester pursuant to the invention can be built in a number of different ways, it has been constructed as disclosed herein for use in connection with sugar cane growing in a field 6 cultivated to provide a central furrow 7 (FIGURES 2 and 3), a left-hand furrow 8 and a right-hand furrow 9.

The harvester includes a main frame 11 fabricated of appropriate structural members to provide a forward, elevated portion 12 and a rearward, depressed portion 13. Disposed at either side of the rearward portion 13 of the main frame 11 and spaced apart so as to run in the furrows 8 and 9, respectively, are rearward, ground-engaging wheels 14 and 16 mounted through universal joints 17 on a drive axle 18.

Figure 3:
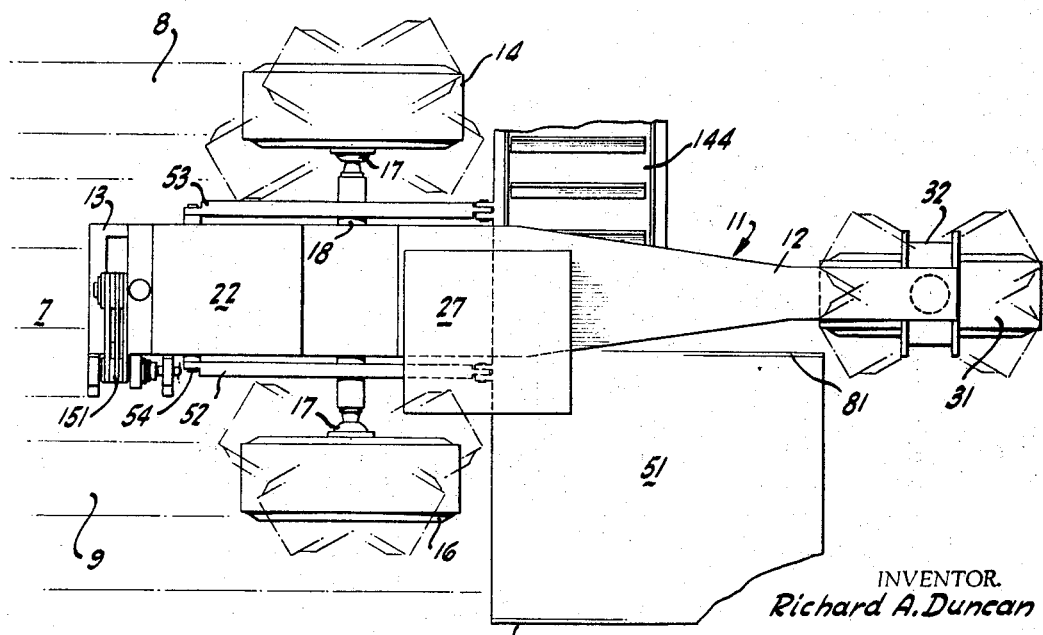
FIGURE 3 is a plan, to a reduced scale, of the mechanism shown in FIGURES 1 and 2, various portions of the machine being omitted.

The rear wheels are arranged not only for driving, but for dirigible or steering motion as illustrated by the dotted lines in FIGURE 3. The axle 18 is appropriately connected to the frame portion 13. The power drive to the axle is effectuated through a drive mechanism 19 (FIGURE 1) joined to the drive shaft 21 of an internal combustion engine 22 mounted on the rearward frame portion 13. When the engine is operated, it drives through the customary transmission mechanism 23 so as to rotate the ground-engaging wheels and so propel the main frame. The direction of operation can be as selected by an operator. Mounted on the raised forward portion 12 of the main frame 11 is an operator's station 24 including a seat 26 under an appropriate shelter 27 and adjacent to customary control structures 28 and 29 for the engine 22.

Not only is the main frame 11 supported on the two driven, dirigible rear wheels 14 and 16, but likewise is supported by a forward wheel 31 engaging the ground in the central furrow 7. The forward wheel 31 is mounted in a fork 32 disposed on the raised forward section 12 of the main frame for pivotal motion about a substantially vertical steering axis 33, so that the front wheel 31 can be turned through steering angles, as shown by the dotted lines in FIGURE 3.

Figure 1:
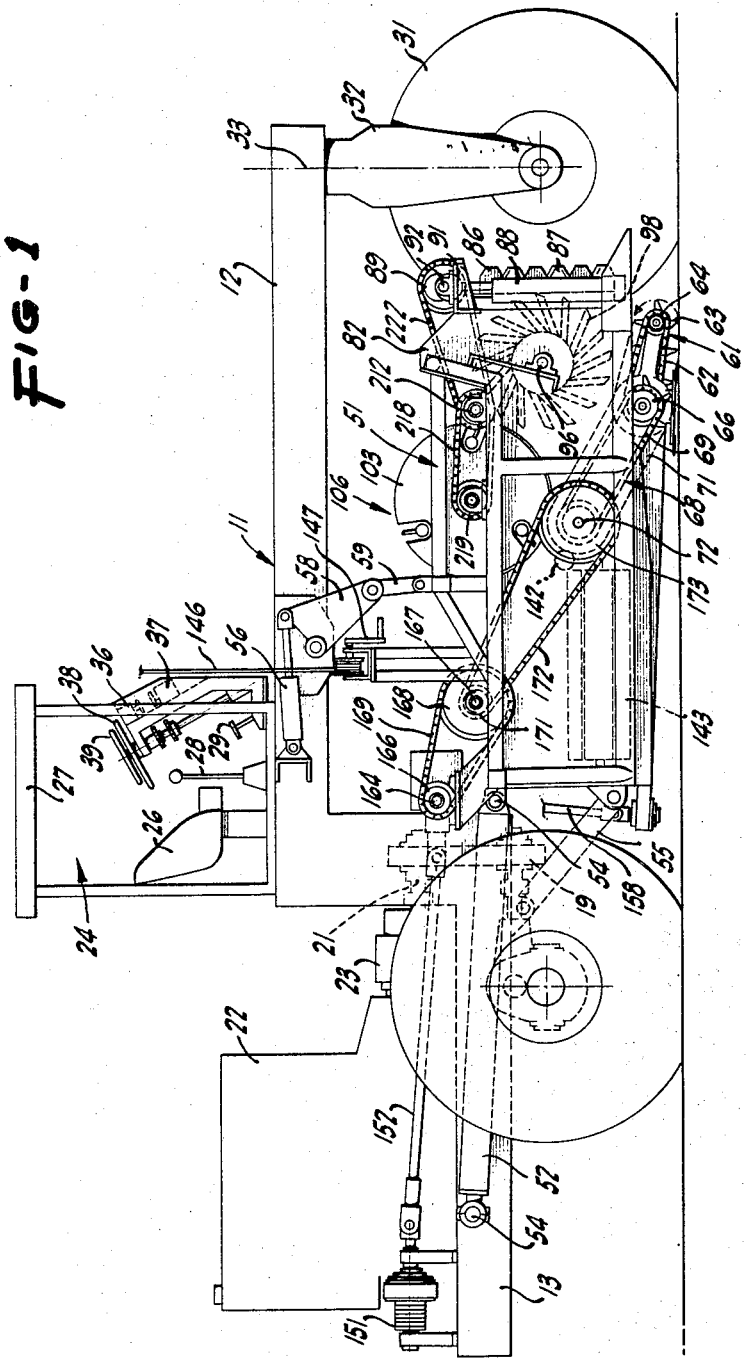
FIGURE 1 is a side elevation of a sugar cane harvester constructed pursuant to the invention, certain portions being omitted for clarity in disclosure and other portions being schematically shown.

Particularly pursuant to the invention, means are provided for steering the rearward and forward ground-engaging wheels in unison or separately. For that reason, appropriate power steering mechanisms (not shown) are provided for control by a pair of steering valves 36 and 37 (FIGURE 1). The valve 36 is regulated by one control wheel 38 at the operator's station 24, while the steering valve 37 is controlled by another control wheel 39 located concentrically with and closely adjacent to the steering wheel 38. The wheels, being closely associated, easily can be individually controlled by the vehicle operator. One of the valves 36, for example, controls steering of the forward wheel 31 only, whereas the other valve 37 controls steering of the two rearward wheels 14 and 16 only, acting as a pair.

Under many circumstances, it is preferred to steer all of the wheels at the same time, although perhaps in different amounts as regulated by other parts of the steering structure. For that reason, the outer control wheel 38 (FIGURES 8 and 9) includes a central web 41 having a number of apertures 42 therein with any one of which a control pin 43 can be engaged. The pin has a knob 44 at its upper end and is secured on a swinging lever 46 joined by a transverse pivot connection 47 to the disk-like upper control wheel 39. A yieldable rubber block 49 is interposed between the lever 46 and the disk wheel 39 so that the rod 43 is normally disengaged from the openings 42.

When the two steering instrumentalities are to be operated in unison and in any selected, relative steering position thereof, the operator operates the control wheel 39 by depressing the knob 44 to interengage the rod 43 in the selected one of the apertures 42. By so doing, the operator unites the two steering controls so that thereafter and while they are interengaged, all of the ground-engaging wheels are simultaneously steered, although perhaps in different relative amounts. In this fashion, the vehicle can be maneuvered to suit the operator's direction. If desired, when the two steering control wheels are disengaged from each other, the forward steering wheel can be operated individually or the two rear steering wheels can be separately operated as a pair. Alternatively, the forward and rearward wheels can be simultaneously operated at different rates or in different directions of steering. In this way, there is afforded a mobile, sugar cane harvester under the control of a single operator for use not only in a field having the three furrows as indicated, but which can also be driven over other terrain and in varying forward and rearward directions and with various lateral or transverse components of motion. An extremely versatile and readily controlled maneuverability is thereby provided for the main frame.

Situated beneath the raised portion 12 of the main frame and longitudinally between the front ground-engaging wheel 31 and the pair of rear ground-engaging wheels 14 and 16 is a harvester frame 51. This frame is made up of the customary shapes and angles and is mounted on the main frame for a rising and lowering movement almost entirely in a vertical direction and is connected so that it can well withstand horizontal thrust. For that reason, the upper, rearward portion of the harvester frame is connected through thrust struts 52 and 53 (FIGURE 3) with the rearward portion of the main frame 11 by pivot or ball connections 54 at both ends of the thrust struts. Also, at either side, the lower rearward portion of the harvester frame is pivotally connected to the rearward portion of the main frame 11 by thrust links 55. By means of this linkage, the harvester frame is confined to an approximately vertical motion relative to that main frame. The pivot points are so chosen, however, that the inclination of the harvester frame at any elevation is at an optimum angle for that elevation.

In order to move the harvester frame with respect to the main frame, there is provided an appropriate hydraulic mechanism driven from the main engine 22. This mechanism has appropriate controls (not shown) at the operator's station effective to regulate a pair of hydraulic jacks 56 and 57 (FIGURE 2) connected to bell cranks 58 on the main frame 11 and joined by links 59 to the upper portion of the harvester frame 51. At the operator's discretion, the jacks 56 and 57 are expanded or contracted so that, as guided by the thrust struts 52 and 53 and the thrust links 55, the harvester frame is appropriately positioned and held.

As the machine advances in a field of sugar cane, the cane growing in the right-hand furrow 9 is severed and is conveyed into the machine for further handling. The severed cane moves between the sides of the harvester frame onto a primary pickup conveyor 61. This includes a number of chains 62, each carrying flight fingers 63, and trained around leading sprockets 64 and trailing sprockets 66. The primary conveyor 61 leads directly to a secondary conveyor 68, including a plurality of chains 69 provided with flight fingers 71, the chains being concentric at their forward ends with the rearward ends of the primary conveyor chains and concentric at their rearward ends with a cross shaft 72. The number, disposition and relationship of the primary and secondary conveyor chains are such that the flight fingers 63 and 71 travel forwardly very close to the surface of the field 6 while the upper runs of the primary and secondary conveyor chains travel upwardly and rearwardly relative to the main frame 11. In this way, random cane and the lower portions of cut sugar cane are encountered, engaged and impelled into the harvester.

For severing the cane in the furrow 9, cutting means are provided. As particularly shown in FIGURES 1 and 4, the harvester frame 51 near its rearward portion supports a hollow cutter housing 76 suspended by appropriate links 77 and at its forward end by a yielding support spring (not shown). The housing 76 is maintained substantially in the position shown in FIGURE 4. At its forward end, the housing 76 carries a vertical shaft 78 provided at its lower end with a rotary cutter 79. The leading portion of the cutter operates very close to or slightly below the surface of the field 6 at the bottom of the furrow 9. As the harvester advances, the sugar cane is cut for induction into the machine.

Auxiliary means are provided for severing sugar cane adjacent the sides of the conveyors 61 and 68 and adjacent a pair of machine side walls 81 and 82 substantially defining the lateral limits of the harvesting operation. At one side, particularly adjacent the wall 81, there is provided a cutting disk 83 disposed in a vertical plane and mounted on a cross shaft 84. When appropriately driven, the revolving disk cuts material extending across it toward the space between the walls 81 and 82. Adjacent the other side wall 82 and extending vertically, there is provided a pair of vertical sickle bars 86 and 87 mounted in a guiding frame 88 and propelled by appropriate eccentrics 89 and 91 on a short cross shaft 92. These sickler bars 86 and 87 cut material extending across them toward the center. Thus, as the device advances, sugar cane disposed between the walls 81 and 82 is severed from its connections and is gathered in primarily by the conveyors 61 and 68.

Means are provided for assisting the inflow of the cut sugar cane. Mounted between the side walls 81 and 82 are means for encountering the sugar cane from the top and for feeding that cane into the machine. This means includes a cross shaft 96 supporting a beater drum 97 for rotation about a transversely extending axis. The drum 97 on its periphery carries a plurality of beater arms 98 extending chordally and individually arranged to form converging helical paths. The beaters 98 are reversely bevelled at their outer ends. When the beater drum 97 revolves in a clockwise direction, as seen in FIGURE 4, the lower ones of the beaters engage the cut sugar cane from above and transfer it into the machine in a swath extending over the primary and secondary conveyors and beneath the nether portion of the beater drum. Since the beaters are arranged in converging helical patterns, they also tend to move the cut cane laterally of the machine to afford a good distribution of the cane on the secondary conveyors.

The cane entering the machine is arranged in a heterogeneous fashion and is usually far too long to be handled in an efficient fashion. Consequently, I provide an arrangement for cutting the cane into shorter portions. Mounted on the sides of the harvester frame is a cross shaft 101 (FIGURE 5) which extends across almost the entire forward portion of the harvester structure. The shaft 101 between its ends carries a pair of head plates 102 and 103 (FIGURE 1) joined by cross connectors 104 and all included in a sickle bar drum 106. The drum revolves about a transverse axis 107 parallel to the other transverse axes of the harvester.

Mounted to reciprocate in appropriate guides 108 extending between the sickle bar drum heads 102 and 103 are pairs of sickle bars 109 and 110 respectively. Since there are several pairs of sickle bars disposed at equal intervals about the periphery of the sickle bar drum 106, particularly as shown in FIGURE 6, the description of one of the pairs of bars and its environment applies equally to the others. The sickle bars are intended to reciprocate in a direction parallel to the axis 107 and jointly to act as severing means as the drum 106 revoles. To afford an improved sickle bar driving mechanism, I provide the structure shown herein.

Journalled freely to rotate about the axis 107 and surrounding the shaft 101 at each end thereof are substantially duplicate swash mechanisms generally designated 111. Each of these mechanisms includes a swash hub 112 located by bushings 113 and thrust bearings 114 and 116 at an appropriate location on the shaft 101 near the end of the drum 106. Journalled on the swash hub at each end is a swash plate 117 including a plate hub 118 and a plurality of parallel ears 119 and 121. Each pair of ears carries a cross shaft 122 having a substantially spherical central portion engaged by the cooperating part 123 of a pitman 124. The other end of the pitman is fabricated to engage a cross pin 126 situated in a clevis 127 disposed at the end of the adjacent one of the sickle bars 109. Similarly, the connections of the swash mechanism at the other end of the sickle bar drum are to the other sickle bar 110 of each of the pairs. The swash mechanisms are arranged so that they operate in unison and with opposite angularity so that in operation the sickle bars are appropriately reciprocated in opposite directions.

So that all parts of the sickle bar drum 106 will rotate in unison about the axis 107, the two swash plates are related to the end plates 102 and 103 for movement in a longitudinal or axial direction relative to each other but against rotation relative to each other. Each of the end plates 102 and 103 has a boss 131 secured thereto and projecting parallel to the axis 107 to hold a blade 132 between follower balls (FIGURE 6) 133 and 134. These are mounted in adjusting screws 136 and 137 in a fork 138 upstanding from the swash plate hub 118. Despite the fact that the angularity of the swash plate with respect to the adjacent side plate varies from time to time and are allowed an axial motion, the respective parts are kept from relative rotation and must rotate in unison.

To make sure that all of the material passing the sickle drum is appropriately cut, the sickle bars are made particularly effective in the lower portion of their rotation by running close to a backing drum 141 (FIGURE 4). This is concentric with the shaft 72 and is disposed between the end chains of the secondary conveyor approximately tangent to the sickle bar drum 106. Cane which flows into the machine must pass between the sickle bar drum and the backing drum and is cut into lengths approximately equal to the peripheral distance between the successive sickle bar pairs on the sickle bar drum.

The sugar cane and accompaning material is cut into portions of predetermined length and is then passed rearwardly over a discharge or transfer roll 142 (FIGURE 4) onto the upper run of a transversely extending discharge conveyor 143. This conveyor is of the belt type and is supported on a lateral extension of the harvester frame. The conveyor has an articulated section 144 (FIGURE 2) the angle of which is adjusted by tackle 146 under control of a hand crank 147. The conveyor 143 can be disposed at the desired location for carrying material received on the upper run and transferring such material laterally and upwardly away from the main frame for further treatment. The lower run of the conveyor returns substantially parallel to the upper run and has a horizontal portion immediately to the rear of the transfer roll 142. Thus, the harvested cane is cut into sections and is transferred by the transfer conveyor or discharge conveyor 143 out of and away from the machine.

Apropriate means are provided for driving all of the power actuated parts of the harvester, preferably utilizing the power of the main driving engine 22. As particularly illustrated in FIGURES 1 and 10, the engine is connected at its rearward end to a power takeoff 151 joined through a propeller shaft 152 to a principal drive gear 153. From this gear the drive is divided into two main outputs. A side shaft 154 extends to a side drive gear 156 having a substantially vertical propeller shaft 157 leading to a driven shaft 158 journalled in the rearward portion of the housing 76. Within the housing, a sprocket 159 is joined by a chain 161 to a driven gear 162 on the knife shaft 78. The shaft 157, like the shafts 152 and 154, is provided with appropriate universal joints so that despite the various positions of the harvester frame with respect to the main frame, there is a continuous drive transmitted to the cutter 79. A propeller shaft 164 with appropriate connections extends to a pair of sprockets 166 driving a lay shaft 167 also provided with a pair of sprockets 168 connected to the sprocket pair 166 by a pair of chains 169. The lay shaft 167 carries another pair of sprockets 171 joined by a pair of chains 172 to a pair of sprockets 173 situated on the cross shaft 72 and thus imparting drive thereto. The primary and secondary conveyors are driven in turn by connections to the shaft 72. Also, the shaft of the transfer roller 142 is driven therefrom by a sprocket 174 joined by a chain 176 to a sprocket 177.

The shaft 72 extends entirely across the harvester frame and at its far end is provided with a pulley 178 connected by a belt 179 to a pulley 181 on the hub of the cutter wheel 83 so that the cutter wheel is revolved as the device advances. At an intermediate point, the cross shaft 72 extends through a gear box housing 183 within which are disposed meshing gears 184 and 186 affording a reversal in direction of rotation. From the gear 186 a shaft 187 extends to a drive sprocket 188 joined by a chain 189 to a sprocket 191 on the shaft 96 of the beater drum 97. Thus, the beater drum is appropriately revolved in the correct direction for feeding the cane into the machine.

Mounted on the shaft 96 is a sprocket 192 joined by a chain 193 to a larger sprocket 194 (FIGURE 5) journalled on the shaft 101. The sprocket 194 is connected by an overload clutch 196 including a sliding, cammed side gear 197 and a restraining spring 198 to the shaft 101. When there is an undue load on the cutter drum so that it tends to stall, the sprocket 194 can still revolve, but intermittently presses the side gear 197 out of position along a keyway 199 which connects the side gear 197 with the shaft 101. The sprocket and side gear thus disengage against the urgency of the spring 198 so that the drive mechanism is not overloaded or damaged. Similar overload clutches are provided elsewhere in the mechanism. When the connection is effective under moderate load, the sprocket 194 is in effect substantially solid with the shaft 101 and so drives the sickle bar drum 106.

Means are particularly provided for assuring that the individual swash hubs always operate in unison and in proper phase relationship to each other. The main gear box 153 has a propeller shaft 201 extending to an outboard gear box 202. A drive shaft 203 extends from the gear box 202 and is appropriately joined to operate the conveyor 143. Also extending from the outboard gear box 202 is a propeller shaft 204 leading to a gear box 206. A driven shaft 207 extends from the gear box 206 and carries a sprocket 208 connected by a chain 209 to a sprocket 211 at the end of a cross shaft 212. The shaft 212 lies across the harvester frame and is journalled thereon. Intermediate its ends, the cross shaft 212 carries a sprocket 213 joined by a chain 214 to a sprocket 216 (FIGURE 5) fastened on one end of the swash hub 112 at one end of the sickle bar drum. Similarly, the shaft 212 carries a sprocket 217 joined by a chain 218 to a sprocket 219 freely rotating on the shaft 101 and joined to the swash hub at the other end of the sickle bar drum. The sprockets 213 and 216 as well as the sprockets 217 and 219 are so connected that the swash plates 117 at the opposite ends of the sickle bar drum are always operated in the correct phase with respect to each other and at the same speed, although this speed substantially differs from the speed of rotation of the shaft 101. In this fashion, the sickle bars are given a rapid, relative, reciprocatory movement as they revolve with the sickle bar drum about the axis 107.

The shaft 212 likewise carries a sprocket 221 joined by a chain 222 to a sprocket 223 on the shaft 92 to operate the eccentrics 89 and 91 for working the vertical sickle bars 86 and 87. In this fashion, the instrumentalities on the harvester frame utilized in cutting the sugar cane at both sides of the side walls 81 and 82 and the lower cutter 79 are operated as the device advances. The beater drum is revolved to impel the cane to flow in in the same direction as the primary and secondary conveyors operate and the main, transverse sickle bars are rapidly reciprocated transversely of the machine as they revolve about the cross axis 107 and as the backing drum is appropriately revolved. The transfer roll is similarly driven and so is the conveyor 143. In this way, the entire structure operates to induce the flow of cut sugar cane into the machine, to align the cane in appropriate position, to cut the sugar cane into appropriate lengths, and to carry it onto a conveyor which discharges the cane from the machine in a lateral direction. All of these instrumentalities are so driven despite rising and falling movement of the harvester frame with respect to the main frame.

With the structure as described, the harvester vehicle can be maneuvered by the operator in any desired fashion and particularly along parallel furrows in a field and will sever and gather in the cane, cut it and discharge it as desired. All of the operation is under the control and supervision of a single operator, who is in an advantageous station immediately above the harvesting mechanism supported and centered between the forward and rearward wheels of the device.

What is claimed is:

1. A sugar cane harvester comprising an elongated main frame, ground engaging wheels spaced apart longitudinally of said frame for supporting said frame from the ground, a harvesting frame, means for suspending said harvesting frame from said main frame and between said longitudinally spaced apart wheels, a cutter drum extending transversely of said harvesting frame, means for supporting said cutter drum for rotation on said harvester frame about a transverse axis, a pair of sickle bars, means for mounting said sickle bars for transverse movement on said cutter drum, a first swash mechanism inclined to said axis, means for connecting said first swash mechanism inclined to said axis, means for connecting first swash mechanism to one of said sickle bars, a second swash mechanism inclined to said axis, means for connecting said second swash mechanism to the other of said sickle bars, and means for coupling said first swash mechanism and said second swash mechanism together.

2. A sugar cane harvester as in claim 1 in which said first swash mechanism and said second swash mechanism are inclined oppositely to each other.

3. A sugar cane harvester as in claim 1 in which a plurality of pairs of sickle bars are arranged parallel to each other on the periphery of said cutter drum, and the corresponding ones of said pairs of sickle bars are all connected to said first swash mechanism and the correresponding other ones of said pairs of sickle bars are all connected to said second swash mechanism.

4. A sugar cane harvester comprising a harvester frame, a cutter drum shaft journalled on said harvester frame, means on said harvester frame for rotating said cutter drum shaft about an axis, a cutter drum mounted on said cutter drum shaft to rotate therewith about said axis, means included in said cutter drum for supporting a pair of sickle bars adjacent the periphery of said cutter drum and parallel to said axis, a pair of sickle bars mounted in said supporting means for reciprocation parallel to said axis, a first swash hub journalled on said cutter drum shaft adjacent one end of said cutter drum, a first swash plate journalled on said first swash hub, a first pitman connecting said first swash plate to one of said sickle bars, a second swash hub journalled on said cutter drum shaft adjacent the other end of said cutter drum, a second swash plate journalled on said second swash hub, a second pitman connecting said second swash plate to the other of said sickle bars, and means for coupling said first swash hub and said second swash hub against rotation relative to each other and for rotation about said axis.

5. A sugar cane harvester as in claim 4 including sprocket wheels fast on each of said swash hubs, a cross shaft, sprockets fast on said cross shaft, and chains connecting each of said sprockets to a respective one of said sprocket wheels.

6. A sugar cane harvester as in claim 4 in which said sickle bars are substantially planar and are disposed with their planes chordally of said cutter drum.

7. A sugar cane harvester as in claim 4 including means interconnecting said cutter drum and said first and second swash plates for relative reciprocation but against relative rotation.

8. A sugar cane harvester as in claim 4 including a backing drum substantially tangent to said cutter drum.

9. A sugar cane harvester as in claim 4 including means for feeding sugar cane to said sickle bars.

References Cited

UNITED STATES PATENTS

| | | | |
|---|---|---|---|
| 610,069 | 8/1898 | Le Blanc. | |
| 724,345 | 3/1903 | Sloane | 56—17 |
| 1,227,630 | 5/1917 | Kohne | 180—26 |
| 1,645,856 | 10/1927 | Eichelberger | 56—220 |
| 1,816,274 | 7/1931 | Veakley | 74—60 |
| 3,103,091 | 9/1963 | Duncan et al. | 56—16 |

ABRAHAM G. STONE, *Primary Examiner.*

P. A. RAZZANO, *Assistant Examiner.*

U.S. Cl. X.R.

56—16; 74—60; 146—119